United States Patent

[11] 3,612,770

[72] Inventors Leo Eduard Zegers;
Wilfred Andre Maria Snijders, both of Emmasingel, Eindhoven, Netherlands

[21] Appl. No. 834,973
[22] Filed June 20, 1969
[45] Patented Oct. 12, 1971
[73] Assignee U. S. Philips Corporation New York, N.Y.
[32] Priority June 29, 1968
[33] Netherlands
[31] 6809257

[54] TRANSMISSION SYSTEM COMPRISING A TRANSMITTER AND A RECEIVER FOR THE TRANSMISSION OF INFORMATION IN A PRESCRIBED FREQUENCY BAND AND TRANSMITTERS AND RECEIVERS TO BE USED IN SAID SYSTEM
9 Claims, 6 Drawing Figs.

[52] U.S. Cl. .......... 179/15 BY, 325/38 R
[51] Int. Cl. .......... H04l 7/00
[50] Field of Search .......... 325/38 A, 38 B, 38 R, 39, 44; 179/15 A, 15 BA, 15 BY

[56] References Cited

UNITED STATES PATENTS

| | | | |
|---|---|---|---|
| 2,745,063 | 5/1956 | De Jager | 325/38 B |
| 3,292,178 | 12/1966 | Magnuski | 179/15 X BA |
| 3,490,045 | 1/1970 | De Boer | 325/38 B |
| 3,303,284 | 2/1967 | Lender | 325/38 A UX |
| 3,337,863 | 8/1967 | Lender | 325/38 A UX |
| 3,492,578 | 1/1970 | Gerrish | 325/38 A UX |
| 3,510,585 | 5/1970 | Stone | 325/38 A X |

*Primary Examiner*—Ralph D. Blakeslee
*Attorney*—Frank R. Trifari

ABSTRACT: A circuit for separating an auxiliary signal component from a main signal component has a pulse restorer and a difference producer coupled to receive the composite signal. The output of the restorer is coupled to the other input of said difference producer through an amplitude controller so that the signals applied to the difference producer are equal. The difference producer output supplies the auxiliary signal.

Figure 1:
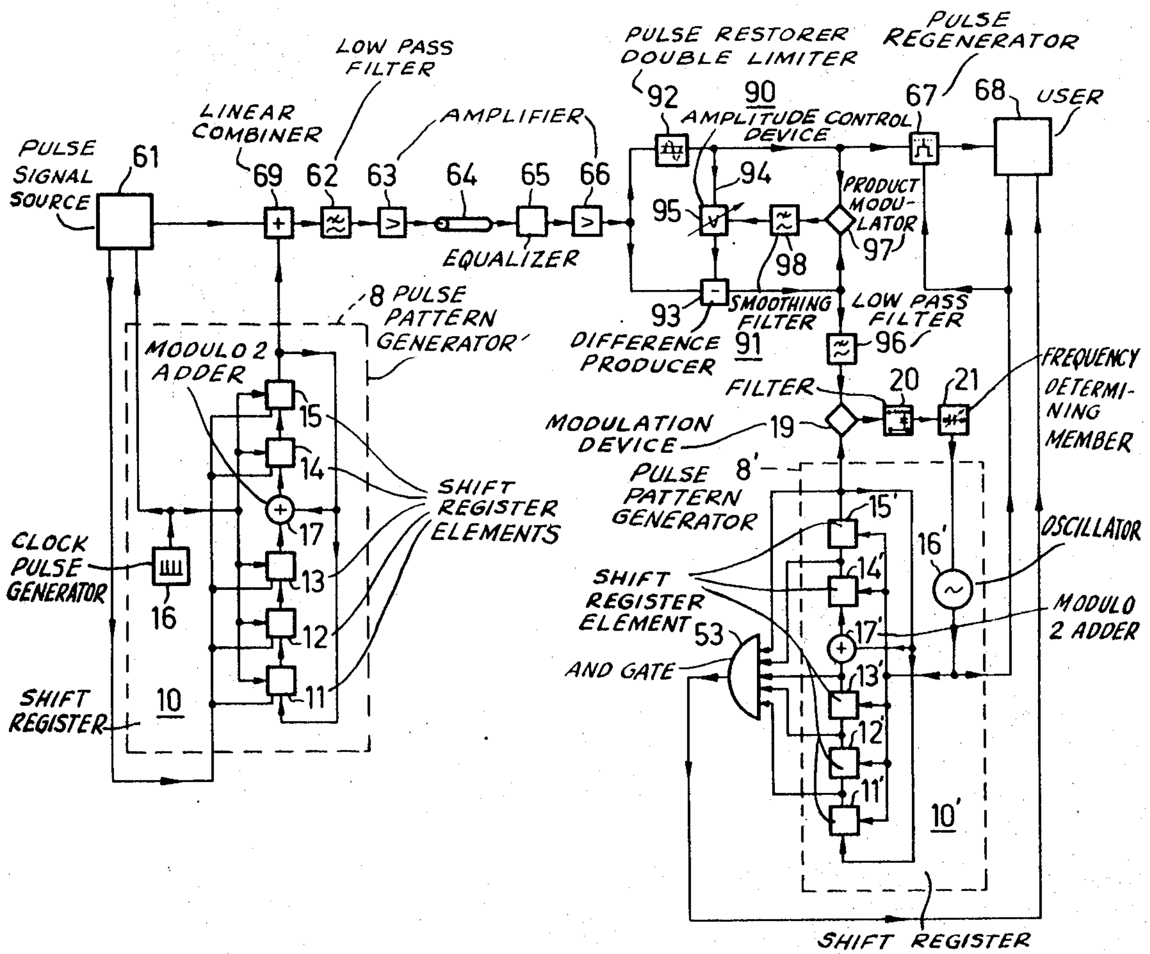

INVENTORS
LEO E. ZEGERS
WILFRED A.M. SNIJDERS
BY
Frank R. Trifari
AGENT

INVENTORS
LEO E. ZEGERS
WILFRED A.M. SNIJDERS
BY
Frank R. Trifari
AGENT

INVENTORS
LEO E. ZEGERS
WILFRED A.M. SNIJDERS
BY
Frank R. Trifari
AGENT

TRANSMISSION SYSTEM COMPRISING A TRANSMITTER AND A RECEIVER FOR THE TRANSMISSION OF INFORMATION IN A PRESCRIBED FREQUENCY BAND AND TRANSMITTERS AND RECEIVERS TO BE USED IN SAID SYSTEM

A prior application Ser. No. 663,783, filed Aug. 28, 1967, which was abandoned by filing continuation application Ser. No. 64,121, on July 30, 1970 relates to a transmission system comprising a transmitter and a receiver for the transmission of information in a prescribed frequency band. The overall information to be transmitted originating from a main information source is formed by a pulse source for bivalent pulses and from an auxiliary information source having a smaller information content than the main information source. The auxiliary information source in said transmission system being is formed by a periodic pulse pattern located within the frequency band of the main information signal and uncorrelated with the main information signal which pulse pattern originates from the auxiliary information source formed by a pulse pattern generator. In the transmitter the pulse pattern is combined with the main information signal without frequency separation and without time separation while in the receiver the main information signal consisting of bivalent pulses and the auxiliary information signal located within the frequency band thereof and combined linearly therewith are applied in common to a modulation device to which also the locally obtained pulse pattern is applied which originates from a local pulse pattern generator corresponding to the pulse pattern generator in the transmitter. The output of the modulation device is connected to a smoothing filter which for automatic phase correction is connected to a frequency determining member of the local pulse pattern generator. In spite of the auxiliary information signal being often transmitted at a considerably lower level than the main information signal, for example, −25 db., as was already described in the prior application, a satisfactory phase stabilization of the local pulse generator at the receiver end on the phase of the auxiliary information signal in the form of the cotransmitted pulse pattern is still obtained.

In order to reduce this already slight influence of the main information signal on the phase stabilization of the local pulse generator at the receiver end, it was already proposed to convert the main information signal formed by bivalent pulses into a multivalent pulse series in a code converter at the transmitter end prior to the combination with the auxiliary information signal. The code converter was formed by a linear combination device to which on the one hand the bivalent pulses were directly applied and on the other hand through a shift register having a number of shift register elements the contents of which are shifted with the clock period of the synchronous pulse series formed by the main information signal. Particularly if the number of register elements is made equal to the number of shift periods in a period of the auxiliary information signal formed by the pulse pattern, then it is achieved that the frequency components of the auxiliary information signal exactly fall in the spectral zeros of the frequency spectrum of the main information signal formed by the multivalent pulse series. Eminent results were achieved in practice with the transmission system described above, but the main information signal formed by the bivalent synchronous pulses must be converted into a multivalent pulse series which is undesirable under circumstances.

An object of the invention is to provide a different conception of a transmission system of the type described in the preamble in which together with a particularly simple construction the influence of the main information signal on the phase stabilization of the local pulse generator is reduced to a great extent without code conversion of the main information signal, while furthermore the sensitivity to interference of the transmission system is reduced.

The transmission system according to the invention is characterized in that the signals received in the receiver and formed by the main information signal and the auxiliary information signal are applied to two parallel arranged channels, the first channel being provided with a pulse restorer for restoring the main information signal formed by the bivalent pulses and the second channel including a difference producer to which the received signal is applied and also the output signal of the pulse restorer, the output of the difference producer being connected to an input of the modulation device connected to the local pulse pattern generator.

In order that the invention may be readily carried into effect, a few embodiments thereof will now be described in detail by way of example with reference to the accompanying diagrammatic drawings in which:

FIG. 1 shows a transmission system according to the invention, while

Figure 2A:
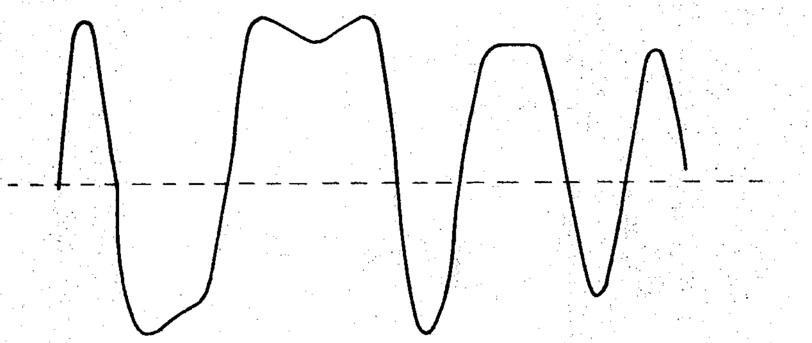
Figure 2B:
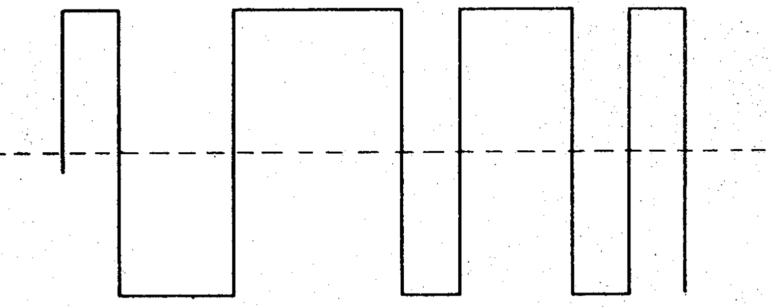
Figure 2C:
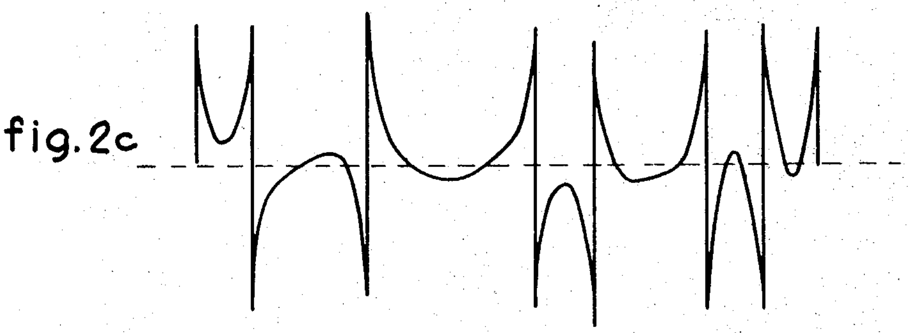
Figure 2D:
Figure 3:
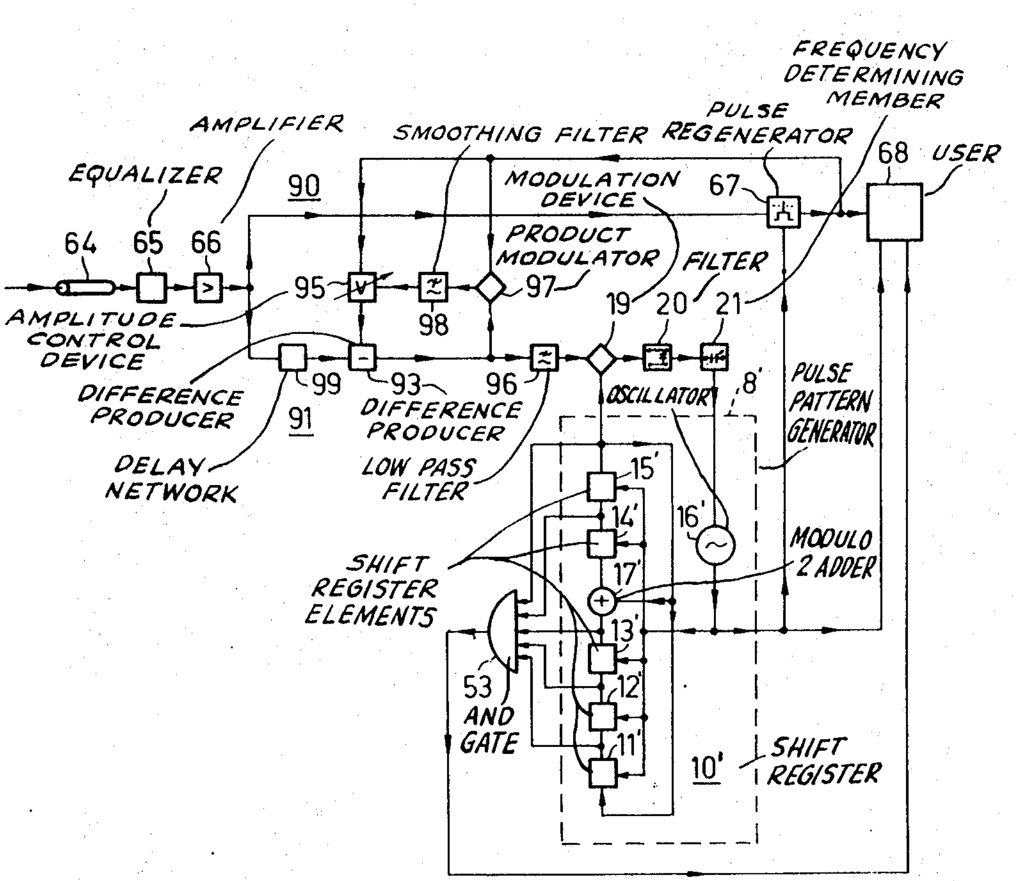

FIGS. 2*a* through 2*d* shows a few time diagrams to explain the transmission system shown in FIG. 1, FIG. 3 shows a modification of a receiver according to the invention shown in FIG. 1.

FIG. 1 shows a transmission system according to the invention which is constructed for the direct transmission in a prescribed frequency band of 0–1,000 c./s. of a main information signal in the form of bivalent pulses the presence and absence of which characterize the main information signal and the instants of occurrence of which coincide with a series of equidistant clock pulses having a clock pulse period D corresponding to a frequency of 2 kc./s. which clock pulses originate, for example, from a clock pulse generator 16. Furthermore the bivalent pulses are arranged in successive groups each consisting, for example, of 31 elements, the first 26 elements in a pulse group containing the actual main information and the following 31−26=5 elements forming the parity check of the main information as in a cyclic (31, 26) code.

In this transmission system the pulse signals originating from a pulse source 61 are applied in the transmitter through a low-pass filter 62 having a cutoff frequency $f_o$ equal to half the clock pulse frequency ($f_o$=1/2*D*=1,000 c./s.) and a pulse amplifier 63 to a transmission path in the form of a cable 64 and transmitted to the receiver in which are arranged successively an equalizing network 65 to equalize the amplitude and phase characteristics of the transmission path 64, a pulse amplifier 66, a pulse regenerator 67 to regenerate the received signal pulses according to shape and instant of the occurrence and an user 68.

In addition to the main information signal a group synchronization signal is also transmitted in this transmission system for marking the instant of beginning of a pulse group in order that the user 68 may recognize the instant of beginning of each pulse group. Thus, the overall information to be transmitted consists of a main information signal in the form of the bivalent pulse series and an auxiliary information signal in the form of a group synchronization signal the information content of which is much smaller than that of the main information signal.

In order to obtain in the transmission system described a particularly efficient transmission of information in accordance with said prior application the auxiliary information signal serving as a group synchronization signal is constituted by a periodic pulse pattern located within the frequency band of 0–1,000 c./s. allotted to the main information signal and uncorrelated with the main information signal, which pattern originates from a pulse pattern generator 8 in the transmitter and is combined in a linear combination device 69 without time separation and without frequency separation with the main information signal within the allotted frequency band of 0–1,000 c./s.

The pulse pattern generator 8 in the transmitter is constructed as a fed-back shift register 10 having a number of shift register elements 11, 12, 13, 14, 15 the contents of which are shifted by the clock pulse generator 16 connected to the shift register with a constant shift period D corresponding to the clock pulse frequency of 2 kc./s., and with a modulo-2-adder 17 incorporated between the shift register elements 13, 14, the output of the shift register 10 being connected on the one hand to the second input of the modulo-2-adder 17 and on the other hand to the input of the shift register 10. When, in switching on the pulse generator 8, a starting pulse, for example, originating from a starting pulse source (not shown) is applied to the input of the shift register 10, the shift register 10 will start generating a series of pulses as a result of the feedback coupling having an each time recurrent period T which, as explained in the parent application, with the shift register in FIG. 1 has the length of $T=(2^5-1)D=31D$.

With the instant of beginning of a pulse group in the main information signal a given condition of the shift register 10 in the pulse pattern generator 8 is coupled which condition, as is known, occurs only once per period T of the generated pulse pattern. For that purpose in the embodiment shown a group synchronization pulse occurring at that instant at a separate output of the pulse source 61 is applied to all the shift register elements 11, 12, 13, 14, 15 through separate inputs so as to bring the shift register 10 in that condition in which simultaneously a pulse appears at the output of all the shift register elements 11, 12, 13, 14, 15. The pulse pattern appearing at the output of the pulse pattern generator 8 is added with a level of, for example, 25 db. below that of the main information signal in the linear combination device 69 to the main information signal within prescribed frequency band of 0–1,000 c./s.

In the cooperating receiver the main information signal and the pulse pattern which is located within the frequency band of 0–1,000 c./s. allotted thereto and linearly combined therewith are applied in common to a modulation device 19 to which also the locally obtained pulse pattern is applied originating from a local pulse pattern generator 8' corresponding to the pulse pattern generator 8 in the transmitter, the output of the modulation device 19 being connected to a smoothing filter 20 which for automatic phase correction is connected to a frequency determining member 21 of the local pulse pattern generator 8'.

In the receiver shown in FIG. 1 the local pulse pattern generator 8' is constructed in the same manner as the pulse pattern generator 8 in the transmitter, corresponding elements being denoted by the same reference numerals which are provided, however, with an index. Furthermore, the modulation device 19 is constructed as a product modulator one input of which is connected to the receiving amplifier 66 and the other input to the local pulse pattern generator 8', the output being connected to a smoothing filter in the form of an integrating network 20, the output voltage of which controls a frequency corrector 21 constructed, for example, as a variable reactance which is connected to an oscillator 16' serving as a local clock pulse generator. To the product modulator 19 is applied on the one hand the received information signal consisting of the main information signal and the pulse pattern and on the other hand the local pulse pattern which corresponds in shape but does not correspond in phase with the pulse pattern generated at the transmitter end.

For illustration FIG. **2*a* shows the signal applied to the product modulator 19 which signal, as was described in the foregoing, is obtained by combining at the transmitter end in the linear combination device 69 the bivalent pulses from the pulse source 61 and from the pulse pattern generator 8 and by applying the bivalent pulses to the product modulator 19 after frequency limiting in the low-pass filter 62 having a cutoff frequency equal to half the clock frequency through the transmission path 64, equalizing network 65, amplifier 66. In addition to the information signal from the pulse source 61 the signal illustrated in FIG. 2*a* also contains the auxiliary information signal originating from the pulse pattern generator 8 which has a considerably lower level than the main information signal, for example, –25 db., while the low-pass filter 62** suppresses the spectrum components located outside its passband of the main information signal and auxiliary information signal formed from bivalent pulses.

As is described in detail in said prior application an integration voltage will be formed at the output of the integrating network 20 on the basis of the uncorrelated condition of the main information signal and the pulse pattern which voltage in the case of coincidence of the two pulse patterns assumes a maximum value and in the case of mutual time shifts of the pulse patterns smaller than the shift period D is proportional to these time shifts, but for larger mutual time shifts has a constant minimum value. By applying this integration voltage as a control voltage to the frequency corrector 21 an accurate phase stabilization of the local pulse generator 16' on the phase of the pulse pattern generated at the transmitter end is obtained.

At the receiver end for generating the local group synchronization signal the instant of beginning of a pulse group in the main information signal is derived from a given condition of the shift register 10' in the local pulse pattern generator 8'. For this purpose in the embodiment shown the output of each shift register element 11', 12', 13', 14', 15' is connected to an individual input of an AND-gate 53 which supplies an output pulse only when simultaneously at the output of each shift register element 11', 12', 13', 14', 15' a pulse appears and applies this output pulse to the user 68 as a group synchronization pulse. As a result of the phase stabilization of the local clock pulse generator 16' on the phase of the pulse pattern generated at the transmitter end, this pulse pattern and the local pulse pattern coincide and hence the conditions of the shift registers 10 and 10', respectively, at the transmitter and receiver ends are the same at any instant, so that the group synchronization pulses occurring at the output of the AND-gate 53 accurately coincide with the group synchronization pulses supplied by the pulse source 61 at the transmitter end. The clock pulses from the local clock pulse generator 16' are applied to the user 68 and are also used for controlling the pulse regenerator 67.

In order to reduce the influence of the phase stability of the local clock pulse generator 16' by the main information signal occurring with a great intensity in the band of the auxiliary information signal, the received signals formed by the main information signal and the auxiliary information signal are applied according to the invention in the receiver to two parallel arranged channels 90 and 91 of which the first channel 90 includes a pulse restorer 92 for restoring the main information signal formed by the bivalent pulses and the second channel 91 includes a difference producer 93 to which the received signals are applied and also the output signal of the pulse restorer 92, while the output of the difference producer 93 is connected to an input of the modulation device 19 connected to the local pulse pattern generator 8'. In the embodiment described the pulse restorer 92 is formed by a double limiter while the connection line 94 between the output of the double limiter 92 and the difference producer 93 incorporates an amplitude control device 95 whose purpose is to make the amplitude of the signal applied through the connection line 94 to the difference producer 93 equal to the amplitude of the signal applied through channel 91 to the difference producer 93.

If the analogue signal shown in FIG. **2*a* is thus applied to the double limiter 92, a signal formed from bivalent pulses arises due to double limiting which signal is brought to the same amplitude in the amplitude control device 95 as the received analogue signal. The signal thus obtained is illustrated in FIG. 2*b* and is applied together with the analogue signal shown in FIG. 2*a* to the difference producer 93**.

Thus, the difference signal is formed in the difference producer 93 between the signal shown in FIG. **2*a* and the limited signal of FIG. 2*b* derived therefrom without time delay, and the difference signal illustrated in FIG. 2*c* results which signal is applied for phase stabilization of the local pulse pattern generator 8' to the modulation device 19**.

Instead of the signal illustrated in FIG. **2*a* the signal of FIG. 2*c* is applied to the modulation device 19 by using the steps according to the invention, and it has been found that the influence of the main information signal on the phase stabilization of the local pulse pattern generator 8'** is reduced to a considerable extent. The special effect occurring in this case can be explained by means of a frequency consideration.

In fact, if the limited signal illustrated in FIG. 2*b* is formed in the double limiter 92 from the analogue signal of FIG. 2*a* located within the passband of the low-pass filter 62, then the amplitude of the auxiliary information signal is reduced to a great extent due to the limiting actions and the original pulse signal from the pulse source 61 is then obtained in a satisfactory approximation, the higher frequency components of the pulse spectrum located outside the passband of the low-pass filter 62 again being formed in addition to the spectrum components located within the passband of the low-pass filter 62. After amplitude control in the amplitude control device 95 and difference production with the received signal shown in FIG. 2*a* in the difference producer 93, the signal shown in FIG. 2*c* arises which is then formed by the auxiliary information signal located in the passband of the low-pass filter 62 in addition to frequency components suppressed to a great extent of the main information signal formed by the pulses from the pulse source 61 and frequency components of the main information signal located outside the passband of the low-pass filter 62.

Thus, a frequency separation is established between the frequency components of the auxiliary information signal and the main information signal by means of double limiting, amplitude control and difference production so that the influence of the main information signal on the phase stabilization of the pulse pattern generator 8' is reduced to a great extent. As a result of the established frequency separation between the frequency components of the auxiliary information signal the undesired frequency components the main information signal may be suppressed with the aid of a low-pass filter 96 thus obtaining the signal illustrated in FIG. 2*d* which is mainly formed by frequency components of the auxiliary information signal.

In spite of the transmission of both the main information signal and the auxiliary information signal of a considerably lower level, for example, −25 db. in the form of bivalent pulses, the influence of the main information signal on the phase stabilization of the pulse pattern generator 8' is reduced to a great extent which results in a considerable extension of the possibilities of use. Because the main information signal is transmitted in the form of bivalent pulses, an optimum insensitivity to interference is obtained, for example, this insensitivity is 3 db. better as compared with a transmission of the main information signal by trivalent pulses while the special simplicity of construction of the system shown renders its practical realization particularly interesting.

As the received signals occur at substantially constant amplitudes at the input of the two parallel arranged channels 90, 91, for example, when the receiver is provided with an automatic gain control (AGC), or as these received signals shows strong variations in amplitude, a fixed adjustment of the amplitude control device 95 may suffice or the amplitude control device 95 must be controlled automatically. The amplitude control device 95 may be formed, for example, by an controlled amplifier.

In the latter case eminent results appear to be obtained in practice by using the amplitude control device shown in the FIGURE and consisting in that the output voltages of the double limiter 92 and of the difference producer 93 are mixed in a product modulator 97, while the output voltage of the product modulator 97 is applied as a control voltage through a smoothing filter 98 to the amplitude control device 95. Already a small amplitude variation of the received analogue signal causes, after difference production in the difference producer 93, a comparatively large variation in the generated control voltage in the product modulator 97 so that a particularly sensitive amplitude control is obtained with this device.

In addition to the amplitude control device shown the amplitude control may alternatively be effected in a different manner. For example, the output voltage of the difference producer 93 could be directly applied as a control voltage to the amplitude control device 95 after rectification and smoothing in a smoothing filter 98. The amplitude control may also be used on the received analogue signal instead of on the limited output signal of the double limiter 92, particularly by including the amplitude control device 95 in the channel 91 prior to the difference producer 93. With all these embodiments it should always be ensured that the signals occurring at the input of the difference producer 93 have mutually equal amplitudes.

FIG. 3 shows a modification of the receiver according to the invention shown in FIG. 1. Corresponding elements are denoted by the same reference numerals.

The pulse regenerator 67 whose output voltage is applied to the difference producer 93 in the manner as already described in FIG. 1 is used in this embodiment instead of a double limiter 92 as a pulse restorer for the main information signal consisting of bivalent pulses. Since, as is known per se, a time delay which is equal to half a clock period is introduced between the regenerated pulses and the received pulsatory signals when using the pulse regenerator 67, a delaying network 99 having a delay time which is equal to half a clock period must precede the difference producer 93 so as to ensure that the spectrum components of the regenerated pulses and of the received main information signal mutually correspond accurately in phase during the difference production in the difference producer 93.

The local pulse pattern generator 8' is stabilized in phase by the auxiliary information signal entirely in the same manner as already described in FIG. 1, and also in this case the influence of the main information signal on the phase stabilization of the pulse pattern generator 8' is reduced to a great extent in spite of the transmission of both the main information signal and the auxiliary information signal in bivalent form and at a level difference of, for example, 25 db.

What is claimed is:

1. A circuit for receiving a composite pulse signal including a main pulse signal component of a selected clock frequency and an auxiliary pulse signal component having said selected clock frequency and a lesser amplitude than said main signal component, said circuit comprising a means for pulse restoring said main signal component having an input coupled to receive said composite signal, and an output; and a difference producer having a first input coupled to receive said composite signal, a second input coupled to said pulse restorer output, and an output; whereby said difference producer output supplies said auxiliary signal component.

2. A circuit as claimed in claim 1 wherein said restoring means comprises a double limiter.

3. A circuit as claimed in claim 1 wherein said restoring means comprises a pulse regenerator synchronized at said clock frequency; and further comprising a delay network coupled to said difference producer first input and having a delay time substantially equal to one-half of the clock period.

4. A circuit as claimed in claim 1 further comprising a low-pass filter coupled to said difference producer output.

5. A circuit as claimed in claim 1 further comprising means coupled to one of said difference producer inputs for controlling the amplitude of one of the signals applied to said difference producer.

6. A circuit as claimed in claim 5 further comprising a product modulator having inputs coupled to said restoring means output and said difference producer output respectively, and an output; and a smoothing filter coupled between said product modulator output and said amplitude controlling means.

7. A circuit as claimed in claim 5 wherein said amplitude controlling means is coupled between said difference producer second input and said restoring means output.

8. A circuit as claimed in claim 1 further comprising a pulse pattern generator; a modulator having inputs coupled to said difference producer outputs and said generator respectively; and means for synchronizing said generator with said auxiliary signal, said synchronizing means being coupled between said modulator and said generator.

9. A circuit as claimed in claim 1 wherein said auxiliary signals is a pseudorandom signal.